M. L. TAYLOR.
LOCKING MECHANISM FOR MOTOR VEHICLES.
APPLICATION FILED MAR. 17, 1916.
1,224,041.
Patented Apr. 24, 1917.
3 SHEETS—SHEET 1.
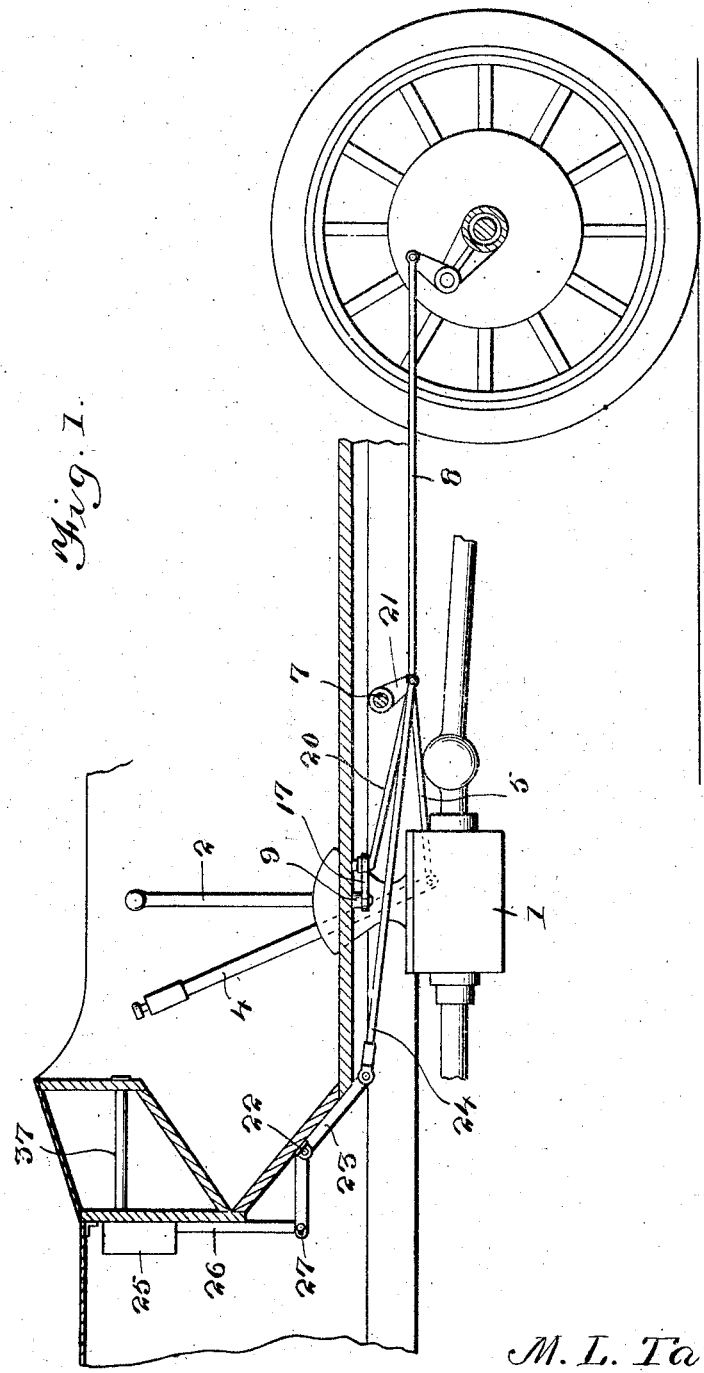
Witnesses
Inventor
M. L. Taylor
By Victor J. Evans
Attorney M. L. TAYLOR.
LOCKING MECHANISM FOR MOTOR VEHICLES.
APPLICATION FILED MAR. 17, 1916.
1,224,041.
Patented Apr. 24, 1917.
3 SHEETS—SHEET 2.
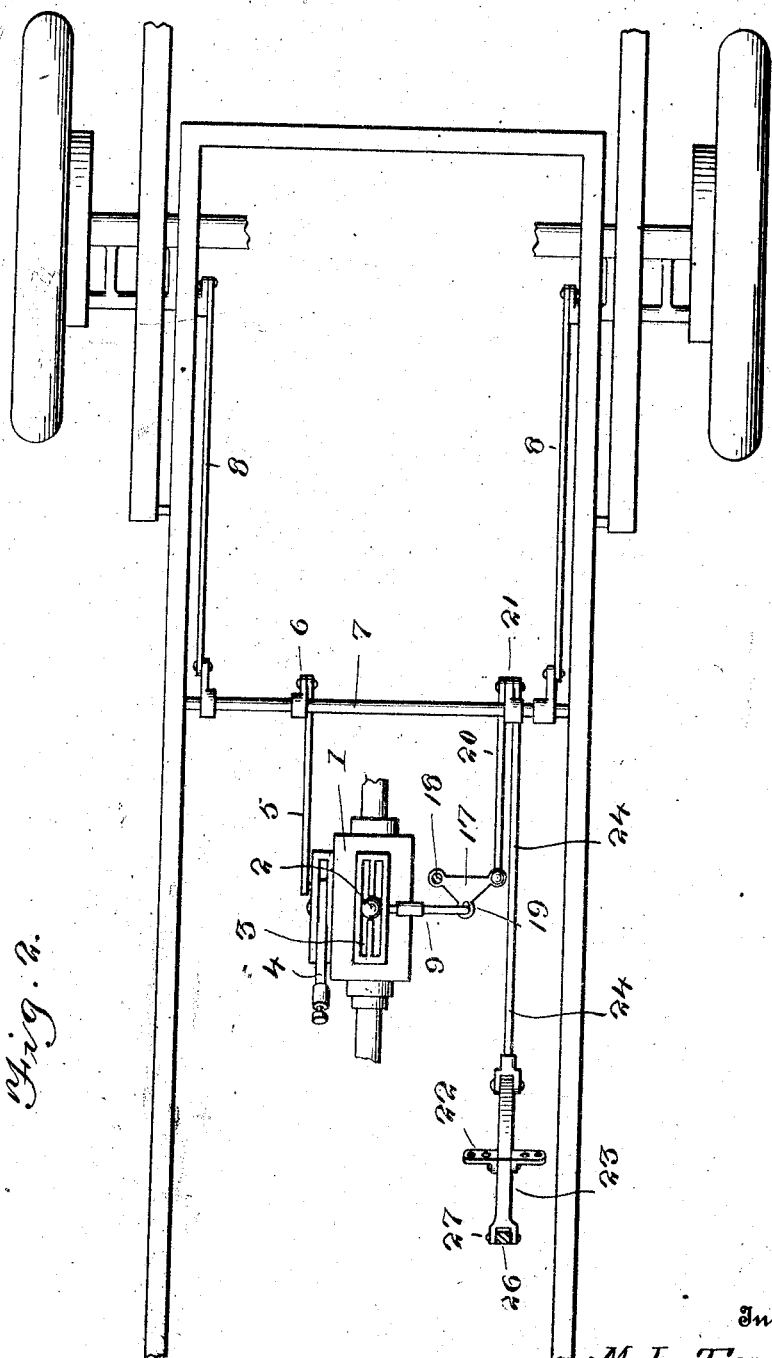

M. L. TAYLOR.
LOCKING MECHANISM FOR MOTOR VEHICLES.
APPLICATION FILED MAR. 17, 1916.
1,224,041.
Patented Apr. 24, 1917
3 SHEETS—SHEET 3.
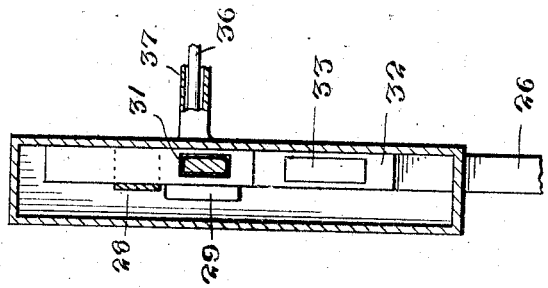
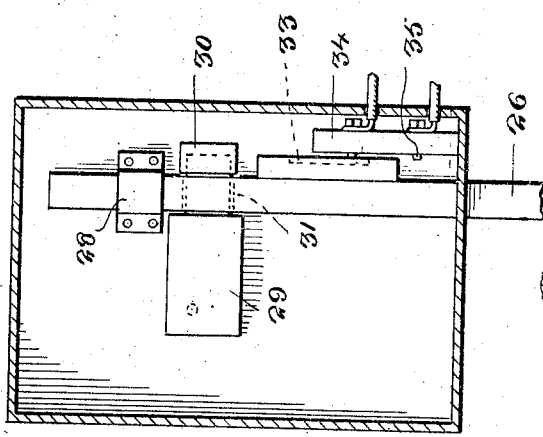
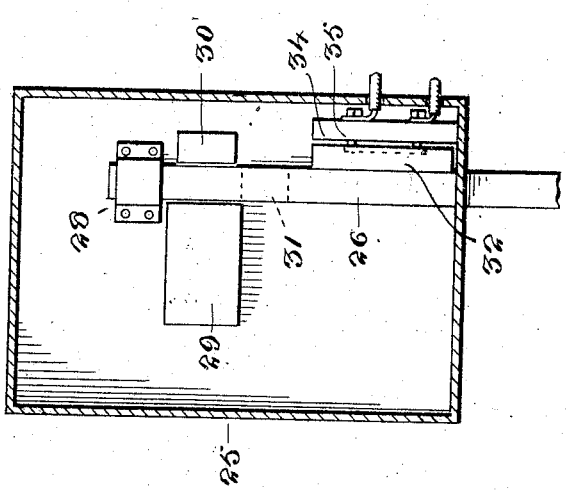
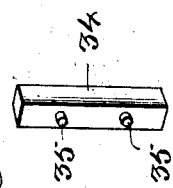
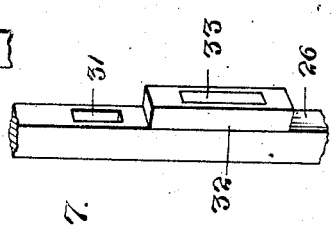
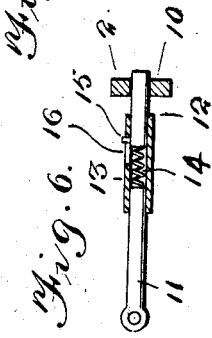
Inventor
M. L. Taylor
Witnesses
By Victor J. Evans
Attorney

UNITED STATES PATENT OFFICE.

MERL LAVERNE TAYLOR, OF PONTIAC, MICHIGAN.

LOCKING MECHANISM FOR MOTOR-VEHICLES.

1,224,041. Specification of Letters Patent. Patented Apr. 24, 1917.

Application filed March 17, 1916. Serial No. 84,875.

*To all whom it may concern:*

Be it known that I, MERL LAVERNE TAYLOR, a citizen of the United States, residing at Pontiac, in the county of Oakland and State of Michigan, have invented new and useful Improvements in Locking Mechanism for Motor-Vehicles, of which the following is a specification.

This invention relates to improvements in locking mechanism for motor vehicles.

In carrying out the present invention, it is my purpose to provide locking mechanism for motor vehicles whereby the emergency brake lever may be locked in "On" position, the gear shifting lever locked in neutral position, and the ignition circuit of the engine broken, thereby preventing theft of the machine.

It is also my purpose to provide mechanism of the type set forth which will be controlled by the emergency brake lever and which will be operated to locking position when the emergency brake lever is swung to a position to apply the brakes.

With the above and other objects in view, the invention consists in the construction, combination and arrangement of parts hereinafter set forth in and falling within the scope of the claims.

In the accompanying drawings;

Figure 1 is a fragmentary longitudinal sectional view through a motor vehicle equipped with locking mechanism constructed in accordance with the present invention.

Fig. 2 is a fragmentary top plan view of the chassis of the vehicle equipped with my improved locking mechanism.

Fig. 3 is a vertical sectional view through the locking mechanism showing the parts in normal position.

Fig. 4 is a similar view showing the parts in locking position.

Fig. 5 is a vertical sectional view taken at right angles to Fig. 4.

Fig. 6 is a sectional view showing a detail of the invention.

Fig. 7 is a fragmentary perspective view of another detail, and

Fig. 8 is a perspective view of a further detail of the invention.

Referring now to the drawings in detail, 1 designates the transmission gear case, while 2 designates the gear shifting lever capable of swinging movement to slide the gears in the case 1 to change the ratio of such gears. This lever 2 works in an H-slot 3, as usual. Pivoted upon one side of the transmission gear case 1 is the emergency brake lever 4 and the lower end of the brake lever 4 is connected through the medium of a link 5 with an arm 6 secured to and depending from the transverse brake rod 7 journaled for rocking movement in horizontally alining bearings carried by the frame of the vehicle. This rod 7 is connected by means of links 8, 8 with the internal expanding band brakes on the rear wheels of the vehicle so that when the lever 4 is swung in one direction motion will be transmitted to the bands of the brakes to expand such bands against the drums, while when the lever is swung in the opposite direction the brake bands will be contracted to release the drums.

Slidably mounted within an opening formed in one side of the casting formed with the H-slot 3 adjacent to the neutral position of the gear shifting lever is a horizontal rod 9 having the inner end adapted to enter an opening 10 formed in the lever whereby such lever may be locked in neutral position. In the present instance, the rod 9 comprises axially alining sections 11 and 12 and surrounding the adjacent ends of the sections 11 and 12 is a sleeve 13 fixed to the section 11 and slidably receiving the section 12. Interposed between the confronting ends of the sections 11 and 12 is an expansion spring 14, while projecting outwardly from the section 12 is a pin 15 working within a slot 16 formed in the sleeve 13, the pin permitting the section 12 to slide within the sleeve and preventing accidental displacement of the section from the sleeve under the action of the spring 14. By means of this construction of the rod, the latter may move inwardly when the lever is out of normal position and in this movement of the rod, the spring 14 will be compressed so that when the lever is moved to neutral position, the section 12 will be projected into the opening 10 in the gear shifting lever incident to the reaction of the spring 14. 17 designates a triangular plate pivoted at one angle to the bottom of the motor vehicle as at 18 and having another angle formed with a slot 19 that receives a pin carried by the outer end of the section 11 of the rod 9. The remaining angle of the plate 17 is connected through the medium of a link 20 with an arm 21 depending from the brake rod 7.

Pivotally connected with a bracket 22 secured to the lower side of the footboard of the vehicle is a bell crank lever 23 and one limb of the bell crank lever 23 is connected by means of a link 24 with the arm 21. Fastened to the front side of the dash board of the vehicle and mounted above the bell crank lever 23 is a casing 25 and slidable through an opening formed in the bottom wall of the casing 25 is a vertical bar 26 having the lower end connected through a pin and slot connection 27 with the remaining limb of the bell crank lever 23. The upper end portion of the bar 26 is slidably mounted within a guide 28 secured to the inner face of one of the walls of the casing 25. Secured to said wall of the casing 25 below the guide 28 is a lock 29 and disposed in alinement with the bolt end of the lock 29 and spaced apart from such end of the lock is a keeper 30 adapted to receive a bolt. The lock and keeper are disposed at opposite sides of the rod 26 and the rod is formed with a slot 31 adjacent to the upper end thereof that is adapted to register with the keeper 30 when the rod 26 is elevated so that the bolt of the lock 29 may be projected through the slot 31 and into the keeper 30 to hold the rod 26 in elevated position. Secured to one edge of the rod 26 is a block 32 of insulating material and fastened to the outer face of the block 32 is a contact strip 33, while disposed adjacent to the edge of the block 32 carrying the strip 33 is a block 34 of insulating material. The block 34 is equipped with pins 35, 35 spaced apart and adapted to be bridged by the strip 33 when the rod 26 is in lowered position.

When the brake lever 4 is in normal or "Off" position, the rod 9 is withdrawn from the opening 10 in the gear shifting lever 2, and the bar 26 lowered so that the pins 35 are bridged by the contact strip 33. The pins 35 and the contact strip 33 constitute a circuit breaker and this circuit breaker is connected in series in the ignition circuit of the hydrocarbon engine of the motor vehicle so that when the bar 26 is elevated the ignition circuit of the motor is broken. When the gear shifting lever 2 is in neutral position and the emergency brake lever 4 swung to "On" position the brake rod 7 is rotated with the effect to move the links 8 and so expand the brake bands to frictionally engage the brake drums to check the rotation of the wheels. In the movement of the brake rod 7 under the action of the brake lever, the link 20 is actuated to swing the plate 17 and in the movement of the plate 17 the section 12 of the rod 9 is thrown into the opening 10 in the gear shifting lever, thereby locking such lever against movement to shift the gears. Simultaneously with the movement of the link 20 motion is imparted to the bell crank lever 23, through the medium of the link 24, thereby swinging the bell crank lever and elevating the bar 26 so that the opening 31 will register with the keeper 30. The bolt of the lock 29 may now be projected through the opening 31 in the bar 26 and into the keeper 30, thereby locking the bar 26 in elevated position. In the upward movement of the bar 26, the strip 33 breaks the connection between the contact pins 35, thereby breaking the ignition circuit of the engine.

It will be noted that when the bar 26 is locked in elevated position, the ignition circuit will be held open, the gear shifting lever locked in neutral position and the brake lever held against movement.

In the present instance, the tumbler of the lock 29 is connected with a horizontal shaft 36 that projects through an opening in the instrument board of the vehicle, as clearly illustrated in Fig. 1 of the drawings, and this shaft 36 is adapted to be rotated by means of a key. Surrounding the shaft 36 is a braking sleeve 37 spanning the space between the dash board and the instrument board as shown in Fig. 1.

While I have herein shown and described one preferred form of my invention by way of illustration, I wish it to be understood that I do not limit or confine myself to the precise details of construction herein described, and delineated, as modification and variation may be made within the scope of the claims without departing from the spirit of the invention.

I claim:

1. In locking mechanism for motor vehicles, the combination with the gear shifting lever having an opening formed therein, the emergency brake rod and the lever for actuating said rod, of a rod operable from said brake rod to enter the opening in said gear shifting lever to lock the latter in neutral position.

2. In locking mechanism for motor vehicles, the combination with the gear shifting lever having an opening formed therein, the emergency brake rod and the lever for actuating said rod, of a rod operable from said brake rod to enter the opening in said gear shifting lever to lock the latter in neutral position, said rod comprising two axially alining sections, means holding said sections against accidental disconnection, and means between the confronting ends of said sections permitting movement of one of the sections relatively to the other.

3. In locking mechanism for motor vehicles, the combination with the gear shifting lever, the emergency brake rod and the lever for actuating said rod, of means operable from said rod to lock the gear shifting lever in neutral position, and means for locking said last means in actuated position.

4. In locking mechanism for motor vehicles, the combination with the gear shifting lever, the emergency brake rod and the lever for actuating said rod, of means operable from said rod to lock the gear shifting lever in neutral position, and key controlled means for locking said last means in actuated position.

5. In locking mechanism for motor vehicles, the combination with the gear shifting lever, the emergency brake rod and the lever for actuating said rod, of means operable from said rod to lock the gear shifting lever in neutral position, and a circuit breaker connected in the ignition circuit of the engine of the vehicle and operable from said rod to break such circuit.

6. In locking mechanism for motor vehicles, the combination with the gear shifting lever, the emergency brake rod and the lever for actuating said rod, of means operable from said rod to lock the gear shifting lever in neutral position, a circuit breaker connected in the ignition circuit of the engine of the vehicle and operable from said rod to break such circuit, and means for locking said brake rod against movement.

In testimony whereof I affix my signature.

MERL LAVERNE TAYLOR.